Oct. 18, 1949.  A. IAFRATE  2,484,948
NAIL EXTRACTOR FOR PNEUMATIC TIRES
Filed Nov. 2, 1948

INVENTOR:
Antonio Iafrate,
BY Louis Chayka
ATTORNEY.

Patented Oct. 18, 1949

2,484,948

UNITED STATES PATENT OFFICE 2,484,948

NAIL EXTRACTOR FOR PNEUMATIC TIRES

Antonio Iafrate, Detroit, Mich.

Application November 2, 1948, Serial No. 57,867

4 Claims. (Cl. 280—158)

1

My device is of a type to be mounted over each individual tire, adjoining the outer periphery of its shoe portion, in a position where being held stationary it is adapted to intercept nails and other small objects imbedded in the body of the tire, as said tire moves in a rotary path past said device.

I shall now describe my said device with reference to the accompanying drawings in which, Fig. 1 is a perspective view of a part of an automobile tire, and a perspective view of my device as it is mounted over said tire;

Similar numerals refer to similar parts throughout the several views.

Figure 1:
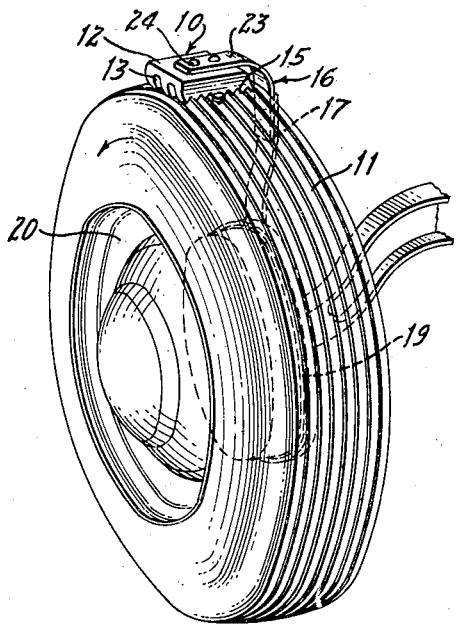
Figure 2:
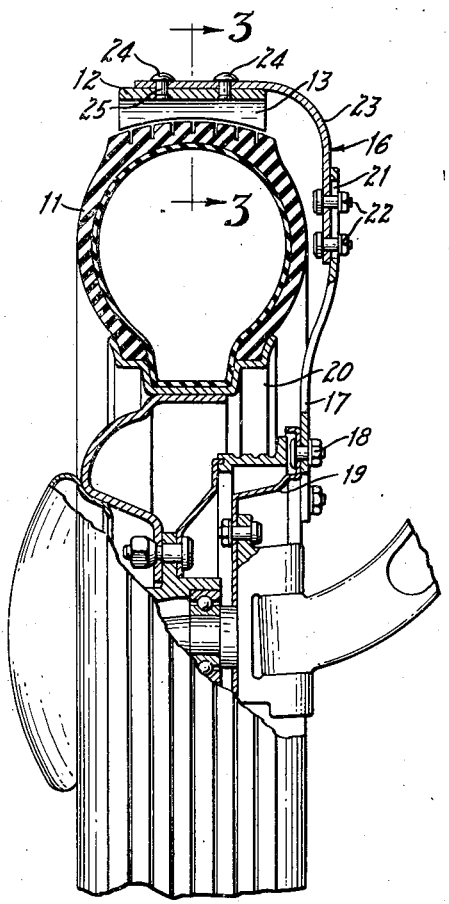
Fig. 2 is a vertical sectional view of said tire and a part of the axle assembly to disclose the manner of mounting my said device for use.

The position of my device, generally indicated by numeral 10, with respect to a tire 11, as it is mounted on a wheel, is shown in Figs. 1 and 2.

Figure 3:
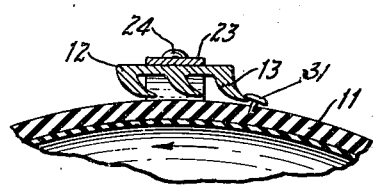
Fig. 3 is a sectional view taken on line 3—3 of Fig. 2.

The device consists of a substantially flat body member 12, substantially rectangular in shape, and is provided on one of its broad surfaces with a plurality of ridges or fins 13 which are disposed parallel to each other. When the device is mounted for operative use, the fins are inclined in the direction opposed to that of the rotation of the wheel with which they are associated, as best shown in Fig. 3, where an arrow indicates the direction of the rotation of tire 11. The device is to be mounted in place with fins facing the thread of a tire, and being in a close proximity to the outer surface thereof. As the outer surface of a tire is arched crosswise, the outer edges of the fins are curved correspondingly so that the spacing between the tire and the fins is uniform all along the length of the respective fins. This is best shown in Fig. 2, where the curvature of the fins is indicated by numeral 14.

For best efficiency of the fins, in their operative use, the edges of the fins are serrated as shown by numeral 15 in Fig. 1.

It is essential for the operation of my device that it be always retained in the same relative position with respect to the wheel with which it is associated. For this reason, the device is

2 mounted not on the body of a respective automobile but on a part of the structure of the wheel itself. This is shown in Figs. 1 and 2, where the device is shown mounted on a suitable bracket. The bracket generally indicated by numeral 16, includes a vertical bar 17, secured at its lower end by means of bolts 18 to the hub portion 19 of a wheel 20, on the side facing the body of the respective automobile. At its upper end the bar contains a vertical slot 21 for admission of bolts 22 by means of which, the bar is connected to an arm 23. The slot and bolt arrangement permit vertical adjustment of the arm with respect to the bar. The upper portion of arm 23 is bent over the outer surface of the shoe portion of tire 11, and serves as a supporting member of my device. The latter is affixed to the arm by rivets 24 fitting into apertures 25 in the body portion of the device.

Figure 4:
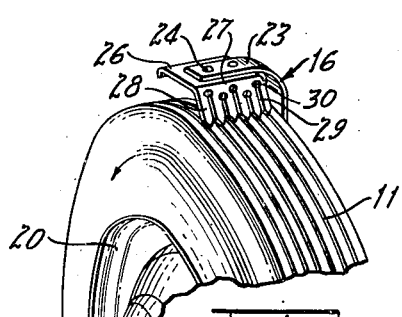
Fig. 4 is a perspective view of a part of a tire with a modified species of my nail extractor mounted over said tire for operative use.
Figure 5:
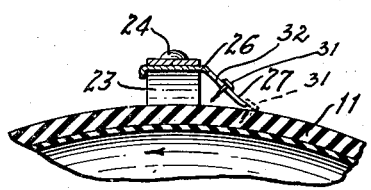
Fig. 5 is a side elevation of my modified species of the nail extractor with an illustration in dotted lines of the manner in which nails are being extracted thereby.

The species shown in Figs. 4 and 5 is similarly mounted in place by means of a bracket 16. Here, however, the device contains a flat body member 26 provided with apertures for connection by means of rivets or screws to arm 23 of bracket 16, and a comb 27, sloping in the direction opposed to that of the rotation of the wheel with which it is associated. The body member, it will be noted, is raised sufficiently above the shoe of the tire, to allow but slight spacing between the outer edge of said comb 27 and the surface of the tire. The comb itself includes a plurality of long teeth 28, in a side by side relation, the teeth being separated by narrow slots 29, each of them terminating at its inner end with an aperture 30.

Now I shall describe the operation of my respective devices, beginning with the species shown in Figs. 1 to 3. The device is mounted in a position over the outer surface of the shoe portion of a tire, as best shown in Fig. 1. The fins project downwardly, being inclined in the direction to oppose that of the rotation of the wheel. As the fins are very close to the outer surface of said tire, they will be in the path of any nail which may be partly imbedded in the body of the tire and projecting above the surface thereof. As a nail will encounter one of the fins, it will be pried out of the tire and permitted to fall loosely to the ground. Should it miss the first fin, the nail will encounter the second or the third one and will be forced out of its place within the fabric of the tire.

As for the species shown in Figs. 4 and 5, it is also adapted to be mounted in a spaced relation to a tire in such a manner that the teeth 28 of the device are inclined towards the surface without, however, being in contact therewith. As a nail partly imbedded in a tire will be carried by said tire towards my device, said nail will enter one of the slots 29 between the individual teeth, with the head 31 of the nail 32 being located over the upper surface thereof, and as the tire travels below the surface of the teeth, the head of the nail will glide upwardly along the incline of the teeth formation. This will cause the nail to be gradually extracted outwardly until the head of the nail will be over the aperture at the inner end of the respective slot when the nail, if extracted, will be allowed to fall through said aperture to the ground.

Figure 5 is a diagrammatic presentation of the action of my device illustrating how a nail traveling upwardly along the incline between adjoining teeth, will be withdrawn from a tire by said incline.

It will be understood that some changes may be made in the structure of my device without departing from the inventive principle disclosed herein. What I, therefore, wish to claim is as follows:

1. In combination with a pneumatic tire mounted on a wheel of a vehicle, a device as described said device comprising, a member having a flat body disposed over the shoe portion of the tire and a plurality of teeth integrally connected to said body and sloping downwardly towards the surface of the shoe, the teeth being separated by oblong slots, each slot terminating at its inner end with a round aperture of a diameter exceeding the width of the slot.

2. In combination with a pneumatic tire of an automobile a nail extractor comprising a flat body member, means to support said body member in a fixed relation of the shoe portion of the tire, and a comb integrally formed with said flat body, the comb being inclined towards, and being disposed at its outer end in a closely spaced relation to the surface of said tire, said comb including a plurality of individual teeth separated by narrow slots for interception of nails partly imbedded in the tire and projecting above the surface thereof, each slot terminating with an aperture exceeding in width the width of said slot for release through said aperture of nails intercepted by said teeth.

3. In combination with a pneumatic tire of a vehicle, a nail extractor of the kind described comprising a substantially flat body member in a spaced relation over the shoe of a tire, the member being provided with a plurality of individual teeth sloping from said body member towards the surface of said tire in the direction opposed to that of the rotation of the tire, the teeth being separated from each other by oblong slots wide enough for admission of nails partly imbedded in the tire, each slot being laterally expanded at its inner end into an aperture for release of said nails.

4. In combination with a pneumatic tire of a vehicle, a nail extractor of the kind described and mounted in a fixed relation with respect to said tire, said nail extractor including a substantially flat body member disposed over the outer surface of the shoe of the tire in a spaced relation thereto and a comb integrally connected to said body member and sloping therefrom towards the surface of said tire, the comb including a plurality of teeth arranged side by side and sufficiently spaced from each other for admission of individual nails partly imbedded in the tire and carried thereby towards said comb during the rotation of said tire, each slot terminating at its upper end with an aperture exceeding in width the width of the slot for release of individual nails intercepted by said comb.

ANTONIO IAFRATE.

REFERENCES CITED

The following references are of record in the file of this patent:

UNITED STATES PATENTS

| Number | Name | Date |
| --- | --- | --- |
| 1,174,476 | Cohen | Mar. 7, 1916 |
| 2,082,141 | Beran | June 1, 1937 |
| 2,407,473 | Carlton | Sept. 10, 1946 |

FOREIGN PATENTS

| Number | Country | Date |
| --- | --- | --- |
| 3,408 | France | Sept. 1, 1904 |
| 76,157 | Switzerland | Nov. 1, 1917 |
| 381,734 | Germany | Sept. 24, 1923 |